United States Patent [19]

Kennedy

[11] Patent Number: 4,976,029
[45] Date of Patent: Dec. 11, 1990

[54] HOT DOG CUTTER APPARATUS AND METHOD

[76] Inventor: Thomas W. Kennedy, 575 Willow St., West Barnstable, Mass. 02668

[21] Appl. No.: 464,364

[22] Filed: Jan. 12, 1990

[51] Int. Cl.$^5$ .............................................. A47J 43/00
[52] U.S. Cl. ...................................... 30/114; 30/358; 30/363; 30/287
[58] Field of Search .............. 30/114, 363, 358, 279.2, 30/287; 99/430, 439, 441, 509; 83/879

[56] References Cited

U.S. PATENT DOCUMENTS

| 2,243,137 | 5/1941 | Vaughan | 99/441 |
| 2,335,806 | 11/1943 | Sjostrom | 83/879 |
| 2,520,000 | 8/1950 | Dettman | 83/879 |
| 3,257,725 | 6/1966 | Dignard | 30/287 |
| 3,465,802 | 9/1969 | Alea | 30/287 |

Primary Examiner—Frank T. Yost
Assistant Examiner—John M. Husar
Attorney, Agent, or Firm—Richard P. Crowley

[57] ABSTRACT

A hot dog or sausage cutter apparatus for making partial cuts in a hot dog or sausage wherein the apparatus has generally curved body sections hingedly connected to permit the sections to move between an open position for the insertion of a hot dog or sausage to be cut and a closed position to make partial cuts in the body of the hot dog or sausage and a plurality of cutting blades extending upwardly from the interior surface of the pair of body sections and typically angular and longitudinal to the longitudinal axis of the hot dog or sausage whereby in placing the hot dog or sausage within the holder and closing the holder, the cutting blades penetrate and partially cut the hot dog or sausage so that the hot dog or sausage thereafter may be removed for cooking or further processing.

6 Claims, 1 Drawing Sheet

HOT DOG CUTTER APPARATUS AND METHOD

BACKGROUND OF THE INVENTION

It is desirable to provide an apparatus for partially cutting tubular food products, more particularly hot dogs, sausages and similar food products, encased in a cellophane or other membrane type holder wherein the food products are elongated in nature. It also desirable to make partial cuts in one or both sides, either perpendicular to the longitudinal axis at an angle thereto or along the longitudinal axis prior to cooking or processing the food product. For example, in the outdoor or indoor cooking of hot dogs, typically the cook will make a plurality of generally angular slices or a longitudinal slice along the individual hot dogs prior to placing the hot dog on the grill so as to prevent the hot dog or sausage from bursting and to permit the escape of gases generated by the cooking process. While such slices may be made in a manual manner or by a complicated processing machine, it is desirable to provide for a simple, inexpensive, portable apparatus in order to make, as desired, partial cuts to a tubular food product, such as a hot dog or sausage.

SUMMARY OF THE INVENTION

This invention relates to a cutting apparatus for making partial cuts in a tubular food product, such as a sausage or a hot dog, and to a method of carrying out such partial cuts.

A simple, inexpensive, portable hot dog/sausage cutter apparatus has been discovered for making in a simple and effective manner partial cuts in the body of a tubular food product, such as a hot dog or sausage. The cutting apparatus typically comprises a pair, such as a first and second, of generally curved body sections having a concave interior surface and the body sections adapted to hold snugly and encompass a hot dog or sausage to be partially cut between the first and second sections. The sections also include hinge means connecting the first and second sections to permit the movement of the body sections of the cutting apparatus between an open position in which the curved sections are aligned in a general plane for the insertion of a hot dog or sausage to be partially cut and a closed cutting position wherein the curved sections are adapted to be closed and meet in cutting engagement so as by such closed position to make partial cuts in the body of the hot dog or sausage.

The cutting apparatus includes, secured to the interior concave surface of the first and second curved body sections, a plurality of cutting blades, each having a generally vertical, upwardly projecting cutting blade with the cutting blades extending for a defined short distance upwardly to as to effect the desired depth and angular cuts in the body of the hot dog or sausage. Typically, the blade depth is designed to cut the hot dog or sausage not greater than about fifty percent, or preferably in between fifty percent and ten percent of the diameter of the tubular food product when the curved sections are in a closed, meeting position. The cutting blades' position within the curved body sections may be positioned perpendicular or more generally at an angle, such as 30° to 45° from the the longitudinal axis of the hot dog or sausage to be cut. The blades generally may comprise from four to twelve cutting blades generally parallelly aligned and spaced apart, and may be placed on one or both sections, and typically alternating on the curved body sections so that upon the placing of the curved body sections in a closed position, the cutting blades extend and cut into the body of the hot dog or sausage the defined depth, and upon placing the curved sections in an open position, the cutting blades are withdrawn and the cut hot dog or sausage can be then easily removed for cooking and further processing.

The cutting apparatus has the curved sections generally hemispherical in nature and aligned so that the interior surface of the curved sections closely fit about the hot dog or sausage and so, in the closed position, the cutting blades will penetrate the hot dog or sausage by squeezing together open, outwardly extending edges of the curved body sections which are not hinged.

The cutting apparatus may be made of plastic or metal or a combination, for example a plastic body with metal cutting blades. The cutting blades may be so positioned as to be replaceable if desired. The cutting blades may be welded or molded in position or bent from a portion of the body. The cutting apparatus is inexpensive and effectively operates to make partial cuts in the hot dog or sausage in a rapid and efficient manner so that the hot dog or sausage may then be cooked without uncontrollable bursting of the outer casing or skin, thereby providing for a more palatable and pleasant looking hot dog or sausage upon cooking or grilling.

The method of the invention comprises inserting a tubular food product to be partially cut, either on one or both sides, into a cutting apparatus comprising two curved body sections and containing interior cutting blades extending upwardly a sufficient distance to effect the partial cuts in the number and depth as desired and moving the curved cutting sections from an open position to receive the hot dog or sausage into a closed, generally mating position enclosing the hot dog or sausage and pressing the sections together so as to cause the cutting blades to penetrate the enclosed hot dog or sausage to a desired depth, and thereafter opening the cutting apparatus to remove the partially cut hot dog or sausage.

The invention will be described for the purposes of illustration only in connection with certain preferred embodiments; however, it is recognized that those people skilled in the art may make various changes, modifications, additions and improvements to the preferred and illustrated embodiment, all falling within the spirit and scope of the invention.

DESCRIPTION OF THE EMBODIMENTS

Figure 1:
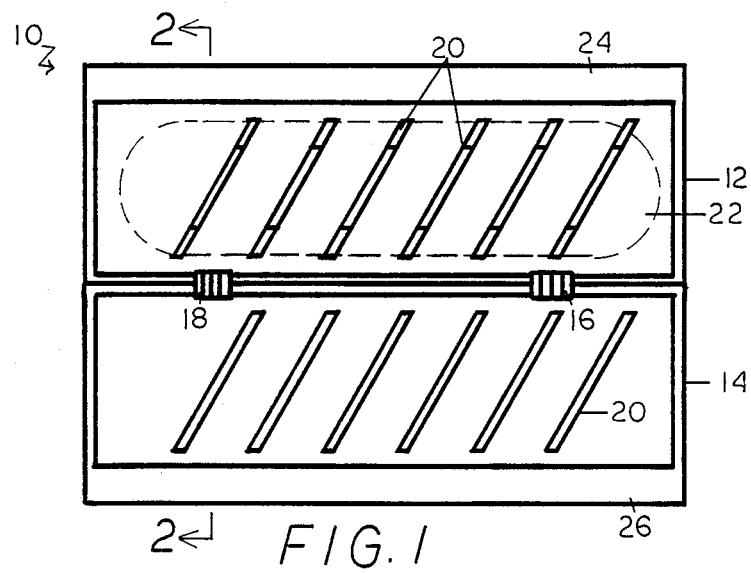
FIG. 1 is a top plan view of the cutting appartus of the invention in the open position with a hot dog ready to be cut as illustrated in dotted lines.
Figure 2:
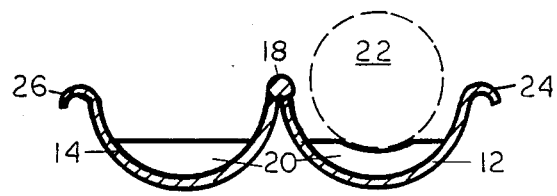
FIG. 2 is a front plan view of the cutting apparatus of FIG. 1 alone lines 2—2.
Figure 3:
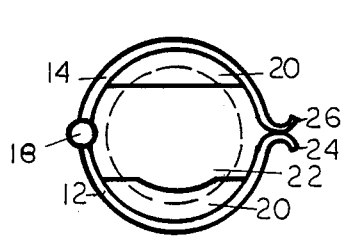
FIG. 3 is a sectional view of the cutting apparatus of FIG. 1 in the closed position illustrating the cutting of the hot dog.

FIG. 1 is a top plan view of the hot dog cutting apparatus 10 of the invention showing two hemispherical, curved bodies 12 and 14 having longitudinal sides, the sides being connected to hinges 16 and 18 so that the cutting apparatus may move between an open positon, illustrated in FIG. 2, and a closed position, as illustrated in FIG. 3. The curved bodies 12 and 14 are adapted in size to fit snugly about the external circumference of a tubular food product, such as a hot dog or sausage 22 shown in dotted lines, to be partially sliced by the cutting apparatus. The curved bodies 12 and 14 have outer edges 24 and 26 which are slightly curved, as illustrated in the open position shown in FIG. 2, and which are used in the closed position, as illustrated in FIG. 3, to press the curved sections 12 and 14 about the hot dog 22 shown in dotted lines so as to force the cutting blade elements 20 shown at a about 30° into the body of the hot dog 22 and therefore to make a partial angular slice across the body of the hot dog 22 when the cutting apparatus is in the closed position shown in FIG. 3. As illustrated, the cutting blades 20 and secured to the interior surface of the curved bodies 12 and 14 and arranged in a generally spaced apart, parallel type relationship with the number and angle of the cutting blades 20 prepositioned, as desired, depending upon the number and the depths of the cuts. As illustrated, the cutting blades 20 are positioned to effect a cut in alternating sequence as shown by the non-symmetrical pattern of the cutting blades 20 on either the body 12 or 14 with depths of about 25% of the radius of the hot dog 22. The blades 20 are shown as arcuate-shaped blades; however, if desired, the blades 20 may be curved at their cutting edge to match the curvature of the interior of the body and thereby affect a greater radial cut into the body of the hot dog.

Figure 5:
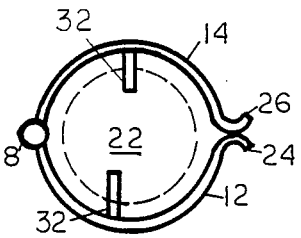
FIG. 5 is a sectional view of the cutting apparatus of FIG. 5 along lines 5—5.
Figure 4:
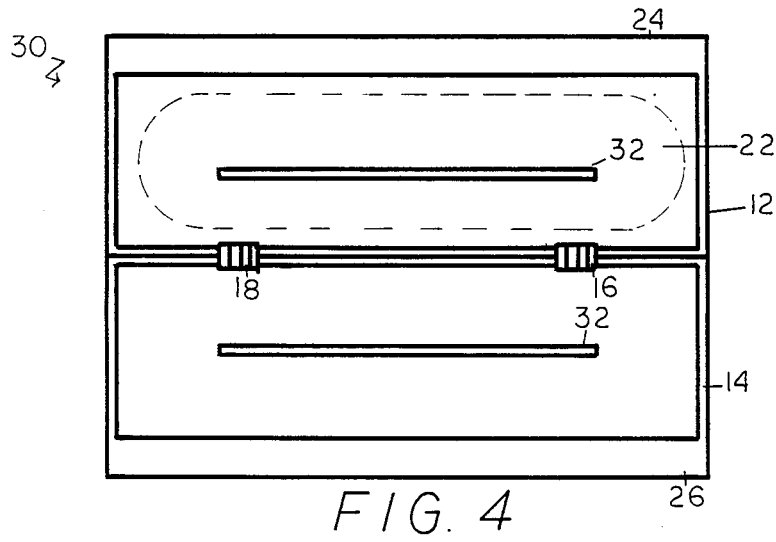
FIG. 4 is a top plan view of another embodiment of the cutting apparatus of the invention in an open position.

FIGS. 4 and 5 illustrate another embodiment of a cutting apparatus of the invention designed to effect a partial, longitudinal cut of a hot dog placed in the cutting apparatus, the cutting apparatus 30 having longitudinally disposed, long cutting blades 32, the blades in each section of the body 12 and 14 axially offset to effect a longitudinal cut on each side of the hot dog 22 generally along the center longitudinal axis of the hot dog 22. If desired, a single blade can be used to affect a single longitudinal cut.

The cutting apparatus as described may be made of a variety of materials, and particularly may be made of a thin metal or have a plastic body with metal cutting blades.

The method of effecting partial cuts in the hot dog or sausage is to place the cutting apparatus 10 in an open position, as illustrated in FIG. 2 or FIG. 4, and to place the hot dog 22 on the surfaces of the cutting blades 20 on either the curved body 12 or 14, as illustrated for example in FIG. 2 or FIG. 4 with the hot dog placed on one side, thereafter closing the curved bodies 12 and 14 to encompass and enclose the hot dog 22 and to press together the outer edges 24 and 26 toward each other so that they mate or come in close mating relationship so as to force the angular cutting blades 20 downwardly into the hot dog 22 a defined distance, and then to open the cutting apparatus and remove the partially cut hot dog 22. A similar technique is followed in connection with the cutting apparatus of FIGS. 4 and 5 wherein one or more longitudinal cuts are placed in the hot dog 22.

The hot dog cutting apparatus as illustrated and described provides for a simple, effective and efficient partial cutting of hot dogs or sausages.

What is claimed is:

1. A cutting apparatus for making partial cuts in tubular food products, such as hot dogs and sausages, which cutting apparatus comprises in combination:
   (a) a holder comprising first and second generally symmetrical, longitudinal curved body sections having one and other sides for each section, the curved body sections each having a concave interior surface which sections together are adapted to hold and encompass a tubular-type food product between the sections to be cut;
   (b) hinge means connecting the one sides of the first and second sections to permit the movement of the curved bodies of the cutting apparatus between an open, generally side-by-side curved body, receiving position and a closed cutting position;
   (c) a lip-type extension edge on the other sides of the body sections extending generally outwardly a short distance from the said body sections to permit the first and second body sections to be pressed together into the closed position for the cutting of the food product; and
   (d) cutting blade means including at least one cutting blade secured to the interior surfaces of one of the curved body sections and extending generally vertically inwardly for a short, predetermined cutting distance
   whereby on the insertion of the tubular food product within the cutting apparatus in the open position and thereafter closing the cutting apparatus to a closed position, the cutting blades make one or more partial cuts into the depth of the food product, and thereafter the cutting apparatus is placed in the open position and the partially cut food product retrieved.

2. The cutting apparatus of claim 1 wherein the cutting blade means comprises a plurality of cutting blades generally uniformly spaced apart on at least one interior surface of the curved body and disposed at an angle to the longitudinal axis of the food product to be cut.

3. The cutting apparatus of claim 2 wherein the cutting blade means are disposed on interior surfaces of both curved bodies, the cutting blade means slightly offset from each other so as to effect partial cuts in the food product on either side thereof when placed in a closed position.

4. The cutting apparatus of claim 1 wherein the curved bodies have generally outwardly curved lip extension edges which curve downwardly from and extend generally the length of the curved bodies in the open position whereby the cutting apparatus may be placed in a closed cutting position by forcing the upward sides inwardly toward each other into a close mating, contacting relationship in a closed cutting position.

5. The cutting apparatus of claim 1 wherein the cutting blade means comprises at least one longitudinally disposed cutting blade disposed generally longitudinally on at least one of the curved bodies so as to effect a longitudinal, partial cut into the food product placed therein.

6. A cutting apparatus for making partial cuts in a hot dog or sausage which cutting apparatus comprises in combination:
   (a) a holder which comprises a first and second, generally symmetrical, semicircular, curved body sections having a one and an other longitudinal side, each section having a concave interior surface and adapted in diameter to encompass and fit snugly about a hot dog or sausage to be cut when the curved sections are in a closed position;

(b) hinge means along adjacent one sides of the curved bodies connecting the first and second parts to permit the movement of the cutter apparatus between the open, generally side-by-side relationship for the insertion of a hot dog or sausage to be cut and a closed cutting position whereby partial cuts are to be made in the hot dog or sausage (c) the opposite adjacent other side of the curved sections each have short, upwardly curved, lip-type longitudinal outer edges to enable the user to place the curved sections into a closed, cutting position for the cutting of the hot dog or sausage by pressing the curved sections toward each other and into a contacting, closed cutting position;

(d) cutting blade means comprising a plurality of generally uniformly spaced apart cutting blades extending generally vertically upright and inwardly and secured to the interior surface of the one and other curved body sections whereby partial cuts are to be made in the hot dog or sausage to a defined depth when the body sections are placed in a closed position.

* * * * *